(12) United States Patent
Neudahl et al.

(10) Patent No.: US 10,259,947 B2
(45) Date of Patent: Apr. 16, 2019

(54) WET OR DAMP SURFACE PREPARATION COMPOSITIONS

(71) Applicant: 3M INNOVATIVE PROPERTIES COMPANY, St. Paul, MN (US)

(72) Inventors: David J. Neudahl, Woodbury, MN (US); Gregg A. Patnode, Woodbury, MN (US); Randall S. Teare, Inver Grove Heights, MN (US); Michael P. Daniels, Inver Grove Heights, MN (US)

(73) Assignee: 3M Innovative Properties Company, St. Paul, MN (US)

(*) Notice: Subject to any disclaimer, the term of this patent is extended or adjusted under 35 U.S.C. 154(b) by 52 days.

(21) Appl. No.: 15/301,427

(22) PCT Filed: Apr. 1, 2015

(86) PCT No.: PCT/US2015/023892
§ 371 (c)(1),
(2) Date: Oct. 3, 2016

(87) PCT Pub. No.: WO2015/153769
PCT Pub. Date: Oct. 8, 2015

(65) Prior Publication Data
US 2017/0174903 A1    Jun. 22, 2017

Related U.S. Application Data

(60) Provisional application No. 61/975,470, filed on Apr. 4, 2014.

(51) Int. Cl.
| | | |
|---|---|---|
| *C09D 5/00* | (2006.01) | |
| *C09D 7/20* | (2018.01) | |
| *C08F 220/06* | (2006.01) | |
| *C08F 220/18* | (2006.01) | |
| *C08F 228/02* | (2006.01) | |
| *C08F 230/02* | (2006.01) | |
| *C09D 133/14* | (2006.01) | |
| *C09J 133/14* | (2006.01) | |
| *C09D 133/02* | (2006.01) | |
| *C09J 109/00* | (2006.01) | |
| *C08F 220/28* | (2006.01) | |
| *C08K 5/05* | (2006.01) | |
| *C08K 5/07* | (2006.01) | |
| *C08K 5/101* | (2006.01) | |

(52) U.S. Cl.
CPC ............ *C09D 5/002* (2013.01); *C08F 220/06* (2013.01); *C08F 220/18* (2013.01); *C08F 228/02* (2013.01); *C08F 230/02* (2013.01); *C09D 7/20* (2018.01); *C09D 133/02* (2013.01); *C09D 133/14* (2013.01); *C09J 109/00* (2013.01); *C09J 133/14* (2013.01); *C08F 2220/1825* (2013.01); *C08F 2220/1858* (2013.01); *C08F 2220/1883* (2013.01); *C08F 2220/283* (2013.01); *C08F 2220/288* (2013.01); *C08K 5/05* (2013.01); *C08K 5/07* (2013.01); *C08K 5/101* (2013.01)

(58) Field of Classification Search
CPC ...... C09D 5/002; C09D 7/001; C09D 133/02; C09D 133/14; C09J 109/00; C08F 220/06; C08F 220/18
See application file for complete search history.

(56) References Cited

U.S. PATENT DOCUMENTS

| | | |
|---|---|---|
| 3,043,196 A | 7/1962 | Palmquist et al. |
| 3,171,827 A | 3/1965 | DeVries et al. |
| 3,518,107 A | 6/1970 | Millen |
| 3,556,637 A | 1/1971 | Palmquist |
| 3,902,666 A | 9/1975 | Ito et al. |
| 3,902,939 A | 9/1975 | Eigenmann |
| 4,490,432 A | 12/1984 | Jordan |
| 4,564,556 A | 1/1986 | Lange |
| 4,758,469 A | 7/1988 | Lange |
| 4,906,523 A | 3/1990 | Bilkadi et al. |
| 5,125,995 A | 6/1992 | D'Haese et al. |
| 5,397,614 A | 3/1995 | Patnode et al. |
| 5,530,038 A | 6/1996 | Yamamoto et al. |
| 5,804,610 A | 9/1998 | Hamer et al. |
| 5,942,280 A | 8/1999 | Mathers et al. |
| 6,217,252 B1 | 4/2001 | Tolliver et al. |
| 6,245,700 B1 | 6/2001 | Budd et al. |
| 6,511,739 B2 | 1/2003 | Kasai et al. |
| 6,518,343 B1 | 2/2003 | Lucast et al. |
| 6,855,386 B1 | 2/2005 | Daniels et al. |
| 7,513,941 B2 | 4/2009 | Frey et al. |
| 7,524,779 B2 | 4/2009 | Frey et al. |
| 2007/0142499 A1 | 6/2007 | Wang et al. |

FOREIGN PATENT DOCUMENTS

| | | |
|---|---|---|
| WO | WO 1994/00519 | 1/1994 |
| WO | WO 2013/033302 | 3/2013 |
| WO | WO 2013/180740 | 12/2013 |
| WO | WO 2015/153987 | 10/2015 |

*Primary Examiner* — Edward J Cain

(57) ABSTRACT

The present application provides a primer composition, a method for treating a wet or damp surface with the primer composition, and a method to improve the adhesion of pavement markers to wet or damp surfaces. The primer composition comprises about 5 weight percent to about 90 weight percent of the reaction product of: (i) about 30 to about 70 parts by weight of an (meth)acrylate ester wherein the (meth)acrylate ester; (ii) about 70 to about 30 parts by weight of a hydrophilic acidic comonomer; and (iii) about 10 to about 100 parts based on 100 parts of the sum of the (meth)acrylate ester and the hydrophilic acid comonomer, of a plasticizer; dissolved in about 10 to about 95 weight percent of at least one organic solvent.

10 Claims, No Drawings

WET OR DAMP SURFACE PREPARATION COMPOSITIONS

CROSS REFERENCE TO RELATED APPLICATIONS

This application is a national stage filing under 35 U.S.C. 371 of PCT/US2015/023892, filed Apr. 1, 2015, which claims priority to U.S. Provisional Patent Application No. 61/975,470, filed Apr. 4, 2014, the disclosure of which is incorporated by reference in its/their entirety herein.

TECHNICAL FIELD

In some embodiments, the present disclosure generally relates to compositions and methods that can be used to treat a wet or damp surface for application of another composition, such as, for example, an adhesive-coated article and/or a pavement marker.

BACKGROUND

Pavement markers (e.g., paints, tapes, and individually mounted articles) guide and direct motorists and pedestrians traveling along roadways and paths. Pavement markers are used on, for example, roads, highways, parking lots, and recreational trails, to form stripes, bars and markings for the delineation of lanes, crosswalks, parking spaces, symbols, legends, and the like. The formed or applied traffic lines created by these pavement markers form a part of the road surface and are thus subjected to the wear and destructive action of traffic.

Many types of pavement markers are applied directly to a roadway or pavement. Because the pavement markers must stick or adhere to the roadway or pavement surface, they require a dry surface to achieve acceptable adhesion. The requirement of a dry surface significantly limits the available time when pavement markers can be applied because it effectively eliminates pavement marker application during times of wet precipitation (e.g., rain or snow) or when the roadway is wet.

Currently, adhesion to these substrates is typically improved somewhat by two means: use of a flame torch and a primer composition. Using a flame torch to dry the roadway is a labor intensive and thus expensive process.

Existing primer compositions typically include a polymeric primer in organic solvent which is brushed or sprayed onto the surface before the pavement marker is applied, as described in U.S. Pat. Nos. 3,902,939, 3,518,107 and PCT Patent Publication No. WO 94/00519 (incorporated by reference herein in their entirety). Examples of primer compositions include organosols, such as disclosed in U.S. Pat. No. 4,906,523 (Bilkadi et al.), and the use of solutions of high molecular weight rubbers in organic solvents Problems still exist, however, in that traffic markings applied to damp surfaces using these primers continue to separate from the roadway after short exposures to traffic and continued weathering.

SUMMARY

A continuing goal in the pavement-marking industry is to find economical products from which to form traffic control stripes having a longer useful life and excellent durability. The inventors of the present application discovered that it would be desirable to be able to apply pavement markers in wet or damp conditions without sacrificing pavement marker performance and adhesion.

The inventors of the present disclosure discovered that application of a solvent-based primer composition including an acrylic polymer to a wet or damp road or pavement permits adequate or acceptable adhesion of a pavement marker to the wet or damp roadway.

In one embodiment, the present application relates to a primer composition for wet or damp surface preparation comprising: (a) about 5 to about 90 weight percent of the reaction product of: (i) about 30 to about 70 weight percent of an (meth)acrylate ester wherein the (meth)acrylate ester; (ii) about 70 to about 30 weight percent of a hydrophilic acidic comonomer; and (iii) about 10 to about 100 parts based on 100 parts of the sum of the (meth)acrylate ester and the hydrophilic acid comonomer, of a plasticizer; and (b) from about 10 to about 95 weight percent of an organic solvent.

In another embodiment, the present application relates to A method for treating a wet or damp surface comprising: providing a primer composition comprising: (a) about 5 weight percent to about 90 weight percent of the reaction product of: (i) about 30 to about 70 parts by weight of an (meth)acrylate ester wherein the (meth)acrylate ester; (ii) about 70 to about 30 parts by weight of a hydrophilic acidic comonomer; and (iii) about 10 to about 100 parts based on 100 parts of the sum of the (meth)acrylate ester and the hydrophilic acid comonomer, of a plasticizer; and (b) from about 10 to about 95 weight percent of an organic solvent; applying the primer composition to a wet or damp surface; and allowing the primer composition to dry.

In yet another embodiment, the present application relates to a method for applying a pavement marker to a wet or damp surface comprising: providing a primer composition comprising: (a) about 5 weight percent to about 90 weight percent of the reaction product of: (i) about 30 to about 70 parts by weight of an (meth)acrylate ester wherein the (meth)acrylate ester; (ii) about 70 to about 30 parts by weight of a hydrophilic acidic comonomer; and (iii) about 10 to about 100 parts based on 100 parts of the sum of the (meth)acrylate ester and the hydrophilic acid comonomer, of a plasticizer; and (b) from about 10 to about 95 weight percent of an organic solvent; applying the primer composition to a wet or damp surface; allowing the pavement marker to dry; and applying a pavement marker to the surface.

DETAILED DESCRIPTION

Various embodiments and implementations will be described in detail. These embodiments and implementations should not be construed as limiting the scope of the present application in any manner, and changes and modifications may be made without departing from the spirit and scope of the disclosure. The scope of the present application should be determined solely by the claims.

In one embodiment, the present application provides a primer composition. In another embodiment, the present application provides a method for treating a wet or damp surface with a primer composition. In yet another embodiment, the present application provides a method to improve the adhesion of pavement markers to wet or damp surfaces.

"Wet surface" as used herein means a surface that has an amount of water that can be can be seen to form puddles or a lamina and the water can be visibly disrupted through contact.

"Damp surface" as used herein means a surface that has a thin coating or layer of water that has not formed puddles and the water cannot be visibly disrupted through contact.

"Primer composition" or "primer" as used herein means a composition which is applied to a surface to improve adhesion of a material (e.g., an adhesive-coated article, a subsequent polymer layer, a pavement marker) to the surface. The primer composition is an anchor layer between the surface and the material.

"Non-volatile" as used herein means that the non-volatile composition (e.g., reaction product of monomers and plasticizer) or component (e.g., plasticizer) generates less than 3 wt % VOC (volatile organic content). The VOC content can be determined analogously to ASTM D5403-93, by exposing the composition or component to a temperature of about 100° C. in a forced draft oven for 1 hour.

"Non-reactive" as used herein means that there are no free radically reactive groups that could co-react with the comonomers or functionalities within the composition that would significantly inhibit the polymerization of the comonomers.

The primer compositions of the present application include the reaction product of at least one monofunctional unsaturated monomer selected from a group consisting of (meth)acrylate esters of non-tertiary alkyl alcohols, the alkyl groups of which preferably comprise from about 4 to about 12, more preferably about 4 to about 8 carbon atoms; and mixtures thereof. Preferred (meth)acrylate monomers have the following general Formula (I)

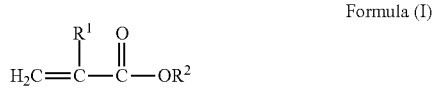

Formula (I)

wherein R1 is H or CH$_3$, the latter corresponding to where the (meth)acrylate monomer is a methacrylate monomer. R2 is broadly selected from linear or branched hydrocarbon groups and may contain one or more heteroatoms. The number of carbon atoms in the hydrocarbon group is preferably about 4 to about 12, and more preferably about 4 to about 8.

Examples of suitable (meth)acrylate monomers useful in the present application include, but are not limited to, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxy ethoxyethyl acrylate, 2-octyl acrylate, monomers comprising structural isomers of a secondary alkyl (meth)acrylate, and mixtures thereof. Particularly preferred are n-butyl acrylate, 2-ethylhexyl acrylate, isooctyl acrylate, lauryl acrylate, and mixtures thereof.

The present primer compositions also include the reaction product of at least one hydrophilic acidic comonomer. Useful hydrophilic acidic comonomers include, but are not limited to, those selected from ethylenically unsaturated carboxylic acids, ethylenically unsaturated sulfonic acids, ethylenically unsaturated phosphonic acids, and mixtures thereof.

Examples of such compounds include those selected from acrylic acid, methacrylic acid, itaconic acid, fumaric acid, crotonic acid, citraconic acid, maleic acid, beta-carboxyethyl acrylate, 2-sulfoethyl methacrylate, styrene sulfonic acid, 2-acrylamido-2-methylpropane sulfonic acid, vinyl phosphonic acid, and the like, and mixtures thereof.

Due to their availability and effectiveness in reinforcing (meth)acrylate pressure sensitive adhesives, particularly preferred hydrophilic acidic monomers are the ethylenically unsaturated carboxylic acids, most preferably acrylic acid.

Minor amounts of monomers copolymerizable with the (meth)acrylate monomers and hydrophilic acidic monomers can be used. Examples of such monomers include (meth) acrylamides, vinyl esters and N-vinyl lactams.

The copolymerizable mixture of the present application comprises, based upon 100 parts by weight total, about 30 to about 70 parts by weight of at least one (meth)acrylate monomer and about 70 to about 30 parts by weight of a hydrophilic acidic comonomer. In some embodiments, the (meth)acrylate ester monomers, when polymerized in the absence of other comonomers, yield a polymer or copolymer having a Tg of less than about 10° C. In other embodiments, the hydrophilic acidic monomers, when polymerized in the absence of other comonomers, yield a polymer or copolymer having a Tg of less than about 40° C.

The ratio of each comonomer in the primer composition can be chosen to optimize the performance. For example, higher levels of the acidic comonomer can increase the overall Tg of the primer composition. However, the increased Tg (and modulus) may necessitate higher levels of plasticizer. Dependant on the desired end use, higher or lower levels of plasticizer may be beneficial. For example, if high cohesive strength is desired, typically lower levels of plasticizer are used. If tack or low peel resistance are desired, higher levels of plasticizer may be beneficial.

The (meth)acrylate monomers and hydrophilic acidic comonomers are inherently incompatible co-reactants and, without a solvent or aqueous reaction medium, fail to significantly interpolymerize. Thus, it is critical that a compatible plasticizer be present during polymerization to serve as a polymerization medium for these co-reactants. The plasticizer is also compatible with the polymerized primer composition.

Useful plasticizers are compatible with the primer composition, such that once the plasticizer is mixed with the comonomers or primer composition, the plasticizer does not phase separate.

By "phase separation" or "phase separate", it is meant that by differential scanning calorimetry (DSC) no detectable thermal transition, such as a melting or glass transition temperature, can be found for the pure plasticizer in the primer composition.

Polymeric plasticizers based on polyether backbones (such as polyethylene glycols) are observed to be more compatible than polyester plasticizers, especially when higher levels of acidic comonomer such as acrylic acid are used. For these same reasons, the plasticizer is also non-volatile.

The plasticizer must remain present and stable under polymerization reaction conditions to serve as a polymerization medium for the marginally compatible (meth)acrylate monomers and hydrophilic acidic comonomers.

In some embodiments, the plasticizer is non-reactive to prevent reaction or interference with the polymerization of the copolymer formed from the (meth)acrylate monomers and hydrophilic acidic comonomers. In these embodiments, plasticizers having acrylate functionality, methacrylate functionality, styrene functionality, or other ethylenically unsaturated free radically reactive functional groups are not used.

Non-reactive plasticizers also reduce the inhibition or retardation of the polymerization reaction and/or the alteration of the final polymer structure that can occur if the plasticizer acts as a chain-transfer or chain-terminating agent. Such undesirable effects can adversely influence the performance and stability of the materials polymerized in the presence of these plasticizers. Chain termination can also result in undesirably high residual volatile materials (i.e., lower conversion of the comonomers).

Particularly useful plasticizers include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as PYCAL 94 (a phenyl ether of polyethylene oxide, commercially available from ICI Chemicals); benzoyl functionalized polyethers, such as BENZOFLEX 400 (polypropylene glycol dibenzoate, commercially available from Velsicol Chemicals) and monomethyl ethers of polyethylene oxides, and mixtures thereof.

The plasticizer can be used in amounts of from about 10 to 100 pph (parts by weight per 100 parts of the (meth) acrylate monomers and hydrophilic acidic comonomers). Typically, the plasticizer is present in the primer composition in amounts from about 15 to 100 pph. In some embodiments, the plasticizer is present in amounts from about 30 to 100 pph.

The amount of plasticizer required depends upon the type and ratios of the (meth)acrylate monomers and hydrophilic acidic comonomers employed in the polymerizable mixture and the chemical class and molecular weight of the plasticizer used in the composition.

Free radical initiators may be used to aid in the copolymerization of (meth)acrylate and hydrophilic acidic comonomers. The type of initiator used depends on the polymerization process.

Photoinitiators which are useful for polymerizing the polymerizable mixture monomers include benzoin ethers such as benzoin methyl ether or benzoin isopropyl ether, substituted benzoin ethers such as 2-methyl-2-hydroxypropiophenone, aromatic sulfonyl chlorides such as 2-naphthalenesulfonyl chloride, and photoactive oxides such as 1-phenyl-1,1-propanedione-2-(o-ethoxycarbonyl)oxime. An example of a commercially available photoinitiator is IRGACURE 651 (2,2-dimethoxy-1,2-diphenylethane-1-one, commercially available from Ciba-Geigy Corporation,). Generally, the photoinitiator is present in an amount of about 0.005 to 1 weight percent based on the weight of the copolymerizable monomers.

Examples of suitable thermal initiators include AIBN (2,2'-azobis(isobutyronitrile)), hydroperoxides, such as tert-butyl hydroperoxide, and peroxides, such as benzoyl peroxide and cyclohexane peroxide.

Optionally, the composition also includes a chain transfer agent to control the molecular weight of the polymerized compositions. Chain transfer agents are materials that regulate free radical polymerization and are generally known in the art.

Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether and mixtures thereof.

The amount of chain transfer agent that is useful depends upon the desired molecular weight and the type of chain transfer agent. The chain transfer agent is typically used in amounts from about 0.001 part to about 10 parts by weight per 100 parts of total monomer, and preferably from about 0.01 part to about 0.5 part, and most preferably from about 0.02 part to about 0.20 part.

The primer compositions of the present application include at least one organic solvent. Suitable organic solvents include at least one of methyl acetate, acetone, isopropyl alcohol, and methyl ethyl ketone.

The content of solids in the primer composition is between about 5 and 90 percent by weight. In some embodiments, the content of solids in the primer composition is between about 10 and 50 or between 25 and 35 percent by weight. Predominantly the content of solids is formed by the polymeric material.

The amount of solids deposited on the surface to be treated depends on the structure of the surface. For example, rougher surfaces to be treated may require a primer composition having a higher content of solids. Typically, the polymeric layer comprises from about 25 to 500 grams/meter$^2$ (g/m$^2$), more preferably from about 50 to 300 g/m$^2$.

In one aspect, the present application provides a primer composition comprising an acrylic polymer and organic solvent in an amount sufficient to provide improved adhesion between wet, damp and dry surfaces (e.g., road surfaces) and pavement markers.

The surfaces to which the primer composition of the present application can be applied include walls and commonly used transportation surfaces such as materials including at least one of asphalt, pavement, bricks, concrete, wood, wood composites, polymers or pavingstones. In some embodiments, the surface to be treated is previously coated with a protective coating. In some embodiments, the surface to be treated is prepared prior to application of the primer compositions, such as, for example, by washing (e.g., using a pressure washer) and/or removing loose materials from the surface to be treated.

Transportation surfaces to which the pavement marking materials of the present application can be applied include, for example, roadways, walkways, bicycle paths, curbs, traffic barriers, barricades, steps, parking lots, and other transportation-related horizontal, inclined or vertical surfaces. The term "pavement" will be used herein and is meant to include all possible transportation surfaces. The pavement marking on the transportation surface can have a thickness of, for example, between about 0.05 cm and about 3 cm, and preferably between 0.13 and 2 mm. Pavement markings can be in the form of any desired indicia including, for example, stripes, text, graphics, and other symbols.

The present primer compositions are suitable to be used with known pavement markers, such as, for example, pavement marking tapes, thermoplastic pavement markers, liquid pavement marking composition compositions and raised pavement markers.

Pavement marking tapes typically include rubber/resin based adhesives. In some embodiments, the adhesive is a pressure sensitive adhesive. In other embodiments, the adhesive is a hot-melt adhesive and a torch, or other localized heating source, may be used to heat the adhesive upon application on the surface. In yet other embodiments, the adhesive is a contact adhesive or contact cement. Suitable rubber resins include tackified rubber, e.g., tackified hydrocarbon resins containing plasticizers such as hydrocarbon oils. Additionally, pavement markers comprising acrylate-based pressure-sensitive adhesive ("PSA"), such as disclosed in U.S. Pat. No. 6,855,386 (incorporated by reference in its entirety herein), may be used.

Thermoplastic pavement markers include those described in U.S. Pat. No. 6,217,252 and PCT Publication No. WO 2013/033302, both of which are incorporated herein by reference in their entirety.

Liquid pavement marking composition compositions include paints and multi-component systems. Suitable multi-component systems include, for example, two-component polyurea based systems such as those described in PCT Publication No. WO 2013/180740, incorporated herein by reference in its entirety Suitable pavement markers may include optical components. Exemplary optical components include, for example, transparent microspheres (i.e., beads), optical elements, and combinations thereof. The optical components may have any desired shape, with spheroidal shapes being preferred. Exemplary transparent microspheres for use in the compositions and articles of the present application include those having a refractive index between about 1.4 and about 2.6. Exemplary transparent microspheres include, for example, glass beads having a refractive index between about 1.4 to about 2.26, and transparent, solid microspheres such as those disclosed in U.S. Pat. No. 6,245,700 (Budd), U.S. Pat. No. 6,511,739 (Kasai), U.S. Pat. No. 7,524,779 (Frey), and U.S. Pat. No. 7,513,941 (Frey), incorporated by reference herein. Exemplary glass beads include those disclosed in U.S. Pat. No. 4,564,556 (Lange) and U.S. Pat. No. 4,758,469 (Lange), incorporated by reference herein. These glass beads are described generally as solid, transparent, non-vitreous, ceramic spheroids having at least one metal oxide phase.

Exemplary optical elements for use in the compositions and articles of the present application include those having a refractive index between about 1.5 and about 2.4. Exemplary optical elements include aggregates (i.e., a polymer matrix with transparent spheres and/or bonded core elements dispersed therein) and bonded core elements (i.e., materials having a core and a plurality of transparent spheres adhered to the core) such as, for example, those described in U.S. Pat. No. 5,942,280 (Mathers), U.S. Pat. No. 3,043,196 (Palmquist, et al.), U.S. Pat. No. 3,556,637 (Palmquist, et al.), and U.S. Pat. No. 3,171,827 (de Vries, et al.), incorporated by reference herein.

The pavement markers may be applied to treated surface by any suitable means, including, for example, extrusion, flame-spraying, and coating on a web followed by application to a roadway. In some embodiments, pavement markers are applied to a roadway using a pavement marking application device. This can be referred to as, for example, a hot-melt extrusion process, and one exemplary hot-melt extrusion process is described in U.S. Pat. No. 3,902,666 (Sakai), incorporated herein by reference.

In some embodiments, the pavement markers include an adhesive that contacts the treated surface. In some embodiments, the adhesive is a hot-melt adhesive, a contact adhesive or a PSA adhesive. In some embodiments, the adhesive is a wet-stick adhesive, such as those described in U.S. Pat. No. 6,855,386 (Daniels et al), and co-filed provisional application 61/975,491, both of which are incorporated herein by reference in their entirety. "Wet-stick adhesive" refers to a material that exhibits pressure-sensitive adhesive properties when adhered to a substrate that has been flooded with water. Wet-stick adhesives may or may not demonstrate pressure-sensitive adhesive properties under dry conditions.

The primer compositions are applied to a surface to be treated and allowed to dry (i.e., wherein at least 50 wt % of the total percentage of the organic solvent is evaporated from the applied primer layer). In some embodiments, 70 wt % of the solvent is evaporated before application of the pavement marker. In other embodiments, at least 80 wt %, 90 wt %, 95 wt % or 99 wt % of the organic solvent is evaporated after application of the primer composition. In some embodiments, heat and/or forced air can be used to speed up the evaporation process. After evaporation of the solvent, an unitary or continuous polymeric layer is formed. The polymeric layer forms an anchor layer between the surface to be marked and the pavement marker.

In some embodiments, the primer composition is allowed to dry for at least 1 minute before application of the pavement marker. In some embodiments, the primer is allowed to dry for at least 1-60 minutes. This time depends among other things, on the volatility of the solvent as well as and environmental conditions.

The polymeric layer (dry) is applied at a thickness appropriate for the specific surface and pavement marker. In some embodiments, the polymeric layer is thick enough to cover any irregularities of the surface and to provide a strong bond to the pavement marker. Preferably, the polymeric layer is not so thick that the pavement markers slip or move, or that there is cohesive failure of the polymeric layer. Typically, the polymeric layer has a thickness of between 0.02 mm and 0.5 mm (1-20 mils). In some embodiments, the thickness is between 0.05 mm to 0.3 mm (this is 2-12 mils)

The primer compositions are spread on the area of surface to be marked by casting, spraying, rolling, coating, spreading, rolling, painting, covering, layering, smearing or brushing.

In the primer composition, the polymer may penetrate the substrate providing mechanical anchorage layer to the road material surfaces. In addition, the polymer may seal the holes of the road surface substrates and thus prevent water and humidity from rising through said holes and contacting the marking materials.

The following examples describe some exemplary constructions of various embodiments of the primer compositions described in the present application. The following examples describe some exemplary constructions and methods of constructing various embodiments within the scope of the present application. The following examples are intended to be illustrative, but are not intended to limit the scope of the present application.

EXAMPLES

Test Methods

Peel force: peel force was measured using wet and dry substrates of Asphalt Grade SPWEA240A as specified in MN DOT Plant Mixed Asphalt Pavement Specification 2360. The wet substrates were prepared by saturating and flooding the substrates with water. At the time of primer application, the wet substrates had a lamina (layer) of water on their surface. Primer compositions of Examples 1 and 2, and Comparative Example A were coated on the substrates using a 5 mil gap on a 8-path wet film applicator from GARDCO (Paul N. Gardner Company, Inc.). A 1 in wide (2.54 cm) pavement marking tape, prepared as described below, was then applied to the primer coated substrates and to one untreated substrate and tamped in six passes with a tamper cart containing 200 pounds of weights (model "RTC-1", available from 3M Company). The "untreated substrate" was not treated with any primer composition before application adhesion of the pavement marking tape. Peel force was measured using a 0-100 pound Accu Force Cadet Force Gage from Ametek, a division of Mansfield & Green.

Materials

| Trade Designation | Description | Supplier |
|---|---|---|
| — | Isooctyl acrylate (IOA) | 3M Company |
| — | Acrylic acid (AA) | Dow Chemical |
| — | Beta-carboxyethyl acrylate (CEA) | Bimax |
| — | Isooctyl thiolglycolate in IOA (IOTG) | Sigma-Aldrich |
| IRGACURE 651 | 2,2-dimethoxy-2-phenyl acetophenone photoinitiator | Ciba Geigy Co. |
| UCON 50-HB-400 | Polyehtylene oxide/propylene oxide copolymer | DOW Company, Midland, MI |
| — | Methyl acetate | Alfa Aesar, Heysham, England |
| BUDENE 1280 | Polybutadiene rubber | Goodyear |
| PICCOLYTE A135 | Alfa-pinene resin | Pinova |

Preparation of Pavement Marking Tape

An adhesive composition was prepared by blending 100 phr (parts per hundred resin) of BUDENE 1280 and 115 phr PICCOLYTE A135.

A pavement marking tape was prepared as generally described in Example 10 of U.S. Pat. No. 4,490,432 (Jordan), incorporated herein by reference in its entirety. The adhesive composition was applied to a 1.5 mm thick flat substrate (backing) comprising nitrile rubber. The adhesive was then cured using electron beam to 4.0 Mrad at 260 kV.

Examples 1 and 2

Polymerizable mixtures were prepared by introducing the materials listed in Table 1, below, in an ethylene vinyl acetate pouch, following the procedure generally described in U.S. Pat. No. 5,804,610, incorporated herein by reference in its entirety. Each pouch (measuring 5 cm by 8.9 cm) contained 19 grams of the polymerizable mixture. The amount of each material in Table 1 is expressed as weight percent (wt %) based on the total weight of the composition.

TABLE 1

| Materials | Example 1 (wt %) | Example 2 (wt %) |
|---|---|---|
| IOA | 32.34 | 32.34 |
| AA | 0 | 32.48 |
| CEA | 32.48 | 0 |
| IRGACURE 651 | 0.09 | 0.09 |
| IOTG | 0.13 | 0.13 |
| UCON 50-HB-400 | 34.96 | 34.96 |

The pouches were placed in a water bath that was maintained at a temperature of about 16° C. and exposed to ultraviolet radiation at an intensity of about 3.5 mW/cm² for 8.5 minutes. The radiation was supplied from lamps having about 90% of the emissions between 300 and 400 nanometers (nm), and a peak emission at 351 nm.

Primer compositions were prepared by dissolving the pouches in methyl acetate at a solids content of about 25%.

Comparative Example A

A commercially available surface preparation composition was obtained from 3M Company of St. Paul, Minn., under the trade designation "SPA-60", and is hereinafter referred to as Comparative Example A.

Peel force was measured as described above. Results are reported in Table 2, below.

TABLE 2

| Examples | Peel Force (lbs) |
|---|---|
| Example 1 | 2.25 |
| Example 2 | 1.55 |
| Comparative Example A | 0.70 |
| Untreated substrate | 0.10 |

All references mentioned herein are incorporated by reference in their entirety.

As used herein, the words "on" and "adjacent" cover both a layer being directly on and indirectly on something, with other layers possibly being located therebetween.

As used herein, the terms "major surface" and "major surfaces" refer to the surface(s) with the largest surface area on a three-dimensional shape having three sets of opposing surfaces.

Unless otherwise indicated, all numbers expressing feature sizes, amounts, and physical properties used in the present disclosure and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. All numerical ranges are inclusive of their endpoints and non-integral values between the endpoints unless otherwise stated.

As used in this specification and the appended claims, the singular forms "a", "an", and "the" encompass embodiments having plural referents, unless the content clearly dictates otherwise.

As used in this disclosure and the appended claims, the term "or" is generally employed in its sense including "and/or" unless the content clearly dictates otherwise.

The phrases "at least one of" and "comprises at least one of" followed by a list refers to any one of the items in the list and any combination of two or more items in the list.

Various embodiments and implementation of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments and implementations other than those disclosed. Those having skill in the art will appreciate that many changes may be made to the details of the above-described embodiments and implementations without departing from the underlying principles thereof. It should be understood that this invention is not intended to be unduly limited by the illustrative embodiments and examples set forth herein and that such examples and embodiments are presented by way of example only with the scope of the invention intended to be limited only by the claims set forth herein as follows. Further, various modifications and alterations of the present disclosure will become apparent to those skilled in the art without departing from the spirit and scope of the present disclosure. The scope of the present application should, therefore, be determined only by the following claims.

What is claimed is:

1. A method for treating a wet or damp surface comprising:
   providing a primer composition comprising:
   (a) about 5 weight percent to about 90 weight percent of the reaction product of:
      (i) about 30 to about 70 parts by weight of an (meth)acrylate ester;
      (ii) about 70 to about 30 parts by weight of a hydrophilic acidic comonomer; and
      (iii) about 10 to about 100 parts based on 100 parts of the sum of the (meth)acrylate ester and the hydrophilic acid comonomer, of a plasticizer; and
   (b) from about 10 to about 95 weight percent of an organic solvent;
   applying the primer composition to a wet or damp surface; and
   allowing the primer composition to dry.

2. The method of claim 1, wherein the primer composition is applied to the wet or damp surface by means of casting, spraying, rolling, coating, spreading, painting, covering, layering, smearing or brushing.

3. The method of claim 1, wherein the wet or damp surface includes at least one of brick, pavingstone, asphalt, wood, wood composite, polymer, concrete or bituminous material.

4. The method of claim 1, wherein the (meth)acrylate ester monomer is selected from a group consisting of n-butyl acrylate, 2-ethylhexyl acrylate, isooctyl acrylate, lauryl acrylate and mixtures thereof.

5. The method of claim 1, wherein the hydrophilic acidic monomer is selected from a group consisting of ethylenically unsaturated carboxylic acids, ethylenically unsaturated sulfonic acids, ethylenically unsaturated phosphonic acids and mixtures thereof.

6. A method for applying a pavement marker to a wet or damp surface comprising:
   providing a primer composition comprising:
   (a) about 5 weight percent to about 90 weight percent of the reaction product of:
      (i) about 30 to about 70 parts by weight of an (meth)acrylate ester;
      (ii) about 70 to about 30 parts by weight of a hydrophilic acidic comonomer; and
      (iii) about 10 to about 100 parts based on 100 parts of the sum of the (meth)acrylate ester and the hydrophilic acid comonomer, of a plasticizer; and
   (b) from about 10 to about 95 weight percent of an organic solvent;
   applying the primer composition to a wet or damp surface;
   allowing the pavement marker to dry; and
   applying a pavement marker to the surface.

7. The method of claim 6, wherein the pavement marker is at least one of a liquid pavement marking composition, a pavement marking tape, and a raised pavement marker.

8. The method of claim 6, wherein the pavement marker includes an adhesive that contacts the treated surface.

9. The method of claim 8, wherein the adhesive is one of a pressure sensitive adhesive, a contact adhesive, and a hot-melt adhesive.

10. The method of claim 6, wherein the primer composition is applied to the wet surface by means of casting, spraying, rolling, coating, spreading, painting, covering, layering, smearing or brushing.

* * * * *

UNITED STATES PATENT AND TRADEMARK OFFICE
CERTIFICATE OF CORRECTION

PATENT NO. : 10,259,947 B2
APPLICATION NO. : 15/301427
DATED : April 16, 2019
INVENTOR(S) : David Neudahl et al.

Page 1 of 1

It is certified that error appears in the above-identified patent and that said Letters Patent is hereby corrected as shown below:

In the Specification

Column 1
Line 56, Delete "solvents" and insert -- solvents. --, therefor.

Column 7
Line 6, Delete "entirety" and insert -- entirety. --, therefor.

Column 7
Line 53, After "61/975,491," insert -- attorney docket number 74429US002, --.

Column 8
Line 21 (approx.), Delete "mils)" and insert -- mils). --, therefor.

Column 9
Line 8 (approx.), Delete "thiolglycolate" and insert -- thioglycolate --, therefor.

Column 9
Line 12 (approx.), Delete "Polyehtylene" and insert -- Polyethylene --, therefor.

Signed and Sealed this
Seventh Day of April, 2020

Andrei Iancu
*Director of the United States Patent and Trademark Office*